April 8, 1930.  B. F. KIESEL  1,753,791
NUT
Filed Oct. 27, 1927

Inventor
Bernhard F. Kiesel

By Swan Frye and Murray
Attorneys

Patented Apr. 8, 1930

1,753,791

UNITED STATES PATENT OFFICE

BERNHARD F. KIESEL, OF DETROIT, MICHIGAN, ASSIGNOR TO F. L. McLAUGHLIN COMPANY, OF DETROIT, MICHIGAN, A CORPORATION OF MICHIGAN

NUT

Application filed October 27, 1927. Serial No. 228,990.

This invention relates to an improved form of nut, and has for its object the association with an ordinary centrally bored and threaded nut of a metal wrapping, which, as hereinafter described, is rendered structurally integral with the nut, and yet a portion of which wrapping is adapted for interlocking engagement with a metallic sheet or similar element placed in association with one end of the nut. The particular use which I have in mind for such a construction, though of course I do not limit myself thereto, is the positioning of the nut in firm structural relation to an automobile door or body so that the threading of the nut may be used as the base or anchorage from which to support some other structural part of the vehicle body, as a bolt, post, or the like.

A indicates a metallic sheet, such as a body or door panel of a motor vehicle, with which it is desired to structurally correlate the nut B, which may be of any desired size or shape, either squared or hexagonal, and whose function when properly associated with the metallic sheet A is to serve as an anchorage or base for some other structural part whose firm connection with the sheet metal panel A is desired.

Figure 1:
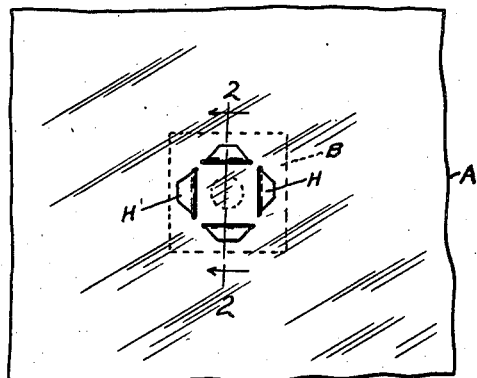
Figure 1 is a view of a fragment of a metallic sheet to which the nut structure herein disclosed has been applied, the position of all of the nut structure except the perforating locking projections being indicated in dotted lines only, because located on the far side of the sheet of metal.
Figure 2:
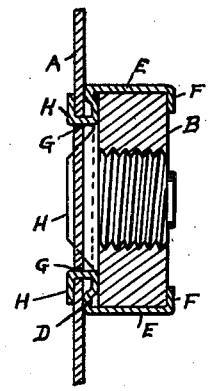
Figure 2 is a sectional elevational view taken along the line 2—2 of Figure 1 and looking in the direction of the arrows there shown.
Figure 3:
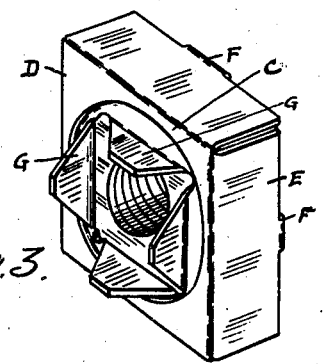
Figure 3 is a perspective of the assembled nut and its wrapping.
Figure 4:
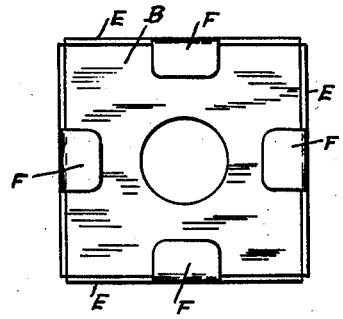
Figure 4 is a view of the underface of the nut.
Figure 5:
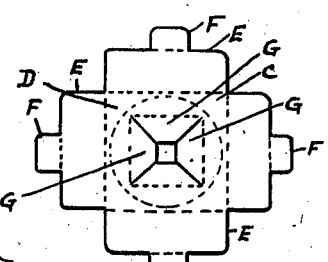
Figure 5 is a plan view on a smaller scale of the metallic wrapping for the nut body as such, as spread out when first cut from a blank and before being bent about the nut body.

As brought out in Figure 3 particularly, I preferably associate about the nut body B a sheet metal stamping or wrapping C, which, except for the centrally apertured or cutaway portion, hereinafter to be described, covers one end surface of the nut body, as D, and in addition has marginal edge portions, as E, which are of corresponding shape and size to the sides of the nut body B and are bent thereover into substantial alignment with the several surfaces thereof. It will of course be possible to extend each side-engaging portions E for further bending into surface engagement with the edge portions of the underface of the nut, but I have found it entirely satisfactory and sufficient to merely provide along the central outer edge of each side piece E, or even two or more of these though not all four, a lip or projection F, which is bent into position of substantial parallelism with the underface of the nut body B. This wrapping or bending about the nut body of the parts D, E, and F results in firmly correlating the two so that, with the metallic wrapping suitably associated with a metallic sheet, the threaded body of the nut may then be employed as an anchorage or base for the suspension or attachment of an external structural part.

To effect this, I aperture the central portion of the wrapping, which would otherwise close the top end of the nut's threaded bore, preferably, and as herein illustrated, by cutting four wedge-shaped or partially triangular lips or flaring branches G, each of which is bent to a position of substantial perpendicularity to the plane of the top surfaces of the wrapping. Each of these is adapted to perforate or to be passed through the metallic panel A, and thereafter to have its extreme tip portions, as H, bent over into clinching position against the opposite face of the metallic panel A from that against which the top surface D of the wrapping rests. Since there are a plurality of these lips or tongues, four being herein illustrated, the opposing directions in which the overbending or clinching of the tips of these lips takes place results in the effecting of a very firm anchorage of the wrapping and its enclosed nut body.

Figure 6:
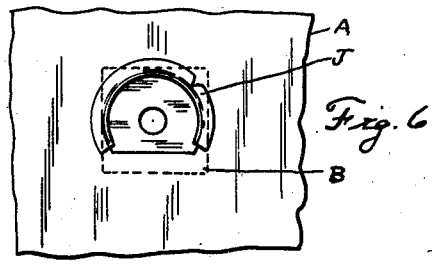
Figure 6 is a view of a slight modification as regards the correlation of the nut structure and the sheet metal panel, in that a D-shaped hole instead of a squared hole is formed in the nut's metal wrapping.

In Figure 6 I have illustrated the adaptability of my idea to a nut sheathing wherein the aperture, whose upstanding edge portions are adapted to be passed through the metal panel or sheet, is shown as of what might be called D-shape. In this form, that side of the aperture represented by the straight edge of the D-shaped hole may or may not have an upstanding lip or projection, while the remaining sides of the aperture, being in a continuous though not necessarily truly circular line, may be made continuous as to its upwardly projecting lip portion or may be separated into two or more parts, as indicated at J. The wrapping of the sheathing about the body of the nut is the same as that already described.

While it will be apparent that the illustrated embodiments of my invention herein disclosed are well calculated to adequately fulfill the objects and advantages primarily stated, it is to be understood that the invention is susceptible to variation, modification and change within the spirit and scope of the subjoined claims.

What I claim is:

1. Means for structurally positioning a centrally bored and threaded nut body upon a laminary surface, comprising a unitary sheet metal wrapping applied about all of the lateral faces and about selected marginal portions of the end faces of the nut, the initially central portion of the sheathing adjacent one end of the nut being apertured with the edges of the sheathing surrounding the aperture extending outwardly for passage through, and locking engagement with, the laminary element with which the association of the nut is desired.

2. In combination with a nut body, a sheet metal wrapping engaging over the sides and marginal parts of the end portions of the nut, the center portion of the wrapping being cut and upwardly bent at a plurality of points surrounding the centrally bored portion of the adjacent end of the nut, forming tongues for passage through a metallic sheet whereon that end of the nut is positioned and with which each tongue is adapted to be bent into interlocking engagement.

3. Fastening structure of the class wherein a nut it attached to a sheet of metal for reception of a bolt, comprising a threaded nut member enclosed within a sheet metal casing, a portion of said casing extending at right angles to the plane of the nut, said sheet of metal being provided with an aperture for receiving the extending portion of the casing, said sheet metal casing and nut being complementally shaped to prevent the nut from turning, and said portion protruding through said aperture being deformed independently of the nut to serve as the sole means for rigidly locking the casing and hence the nut unit to the sheet metal article.

4. Fastening structure of the type wherein a nut is attached to a sheet of metal for the reception of a bolt, comprising a nut unit including a standard nut member at least partially enclosed on the sides, bottom and top by a sheet metal casing, said sheet metal article being provided with an aperture and said sheet metal casing being provided with an extension protruding through said aperture, said casing being so shaped and said extension being turned over to permanently clinch the sheet metal article between two surfaces of said sheet metal casing whereby said nut unit is permanently attached to the sheet metal article independently of the nut member.

5. As a new article of manufacture, a nut unit of the type adapted to be permanently clinched in an aperture in a sheet metal article, comprising a substantially square standard nut element for receiving a bolt, and an exterior member having fixed walls enclosing a portion of the top and bottom walls and side walls of the nut, said exterior member having a portion non-rotatably cooperating with said aperture in said sheet metal article and being permanently distorted to serve as the sole means for clinching the nut unit in position.

In testimony whereof I sign this specification.

BERNHARD F. KIESEL.